INVENTOR.
WILLIAM W. SMITH
BY Robert A. Casey
ATTORNEY

United States Patent Office 3,440,579
Patented Apr. 22, 1969

3,440,579
ELECTRIC CIRCUIT BREAKER WITH OVER-CURRENT AND GROUND FAULT PROTECTION
William W. Smith, West Hartford, Conn., assignor to General Electric Company, a corporation of New York
Filed June 19, 1967, Ser. No. 646,984
Int. Cl. H01h 73/22
U.S. Cl. 335—18                                    5 Claims

ABSTRACT OF THE DISCLOSURE

A unitary circuit breaker of the molded case type includes within its casing means sensitive to ground faults, means sensitive to overcurrents and means sensitive to short circuit currents, all of which act on a common trip latch of the breaker to cause automatic opening. The overcurrent sensitive means comprises thermal current-responsive means which includes a bimetallic strip connected electrically in series with the breaker contacts. The short circuit sensitive means comprises magnetic current-responsive means, also in series with the contacts. The ground fault sensitive means comprises a second bimetallic strip connected in the "ground" or "return" line from the load, but physically located within the breaker casing and arranged to oppose the tripping force of the bimetallic strip of the thermal current-responsive means.

BACKGROUND OF THE INVENTION

Field of the invention

The present invention relates to electric circuit breakers, i.e., manually and automatically operable switching devices including means for causing automatic opening in response to predetermined electrical conditions.

Description of the prior art

Electric circuit breakers commonly comprise a housing and a manually operable mechanism for operating contacts therein at will between open and closed circuit positions. In addition, current responsive means is commonly included for causing automatic opening of the contacts upon occurrence of certain predetermined current conditions through the circuit breaker. This current responsive means includes means for protecting the circuit against "over-current" conditions wherein the magnitude of the current through the breaker is roughly from 125% to 300% of the nominal rating of the breaker, and against "short circuit" conditions, wherein the currents are in excess of 300% of the nominal rating. Such prior art circuit breakers do not, however, afford protection against "ground faults" unless they draw current in the ranges covered by the aforementioned overcurrent and short circuit protecting sensing means. Ground faults sometimes occur, however, which draw currents of values less than the 125% of the nominal current rating of the circuit breaker. Such ground faults are not detected by prior art circuit breakers, and can cause serious damage to property or hazard to personnel.

It is an object of the present invention, therefore to provide a novel, unitary circuit breaker which is capable of providing ground fault protection as well as overcurrent and short circuit protection.

SUMMARY OF THE INVENTION

In accordance with the invention, that the foregoing objects and other advantages are achieved by the provision of a unitary automatic circuit breaker which includes within a single casing circuit breaker trip means capable of actuation by means responsive to ground faults as well as by means responsive to overcurrent and short circuit conditions. In accordance with another aspect of the invention, a novel means sensitive to ground faults is provided which comprises a second current responsive means located in the return line of the system arranged to oppose the tripping action of a first current responsive means located in the outgoing line (which may be the usual current responsive means of the overcurrent type). Current unbalance lessens the opposition of the second current responsive means permitting the first to cause tripping.

The invention will be more fully understood from the following detailed description and its scope will be pointed out in the appended claims.

Description of the preferred embodiments

Figure 1:
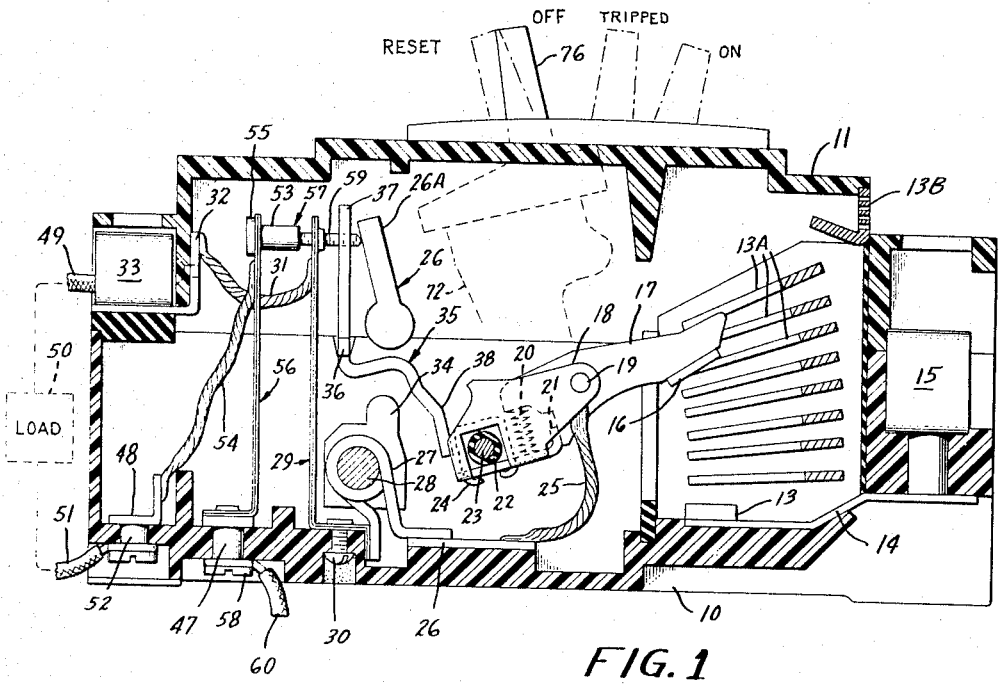
FIGURE 1 is a side elevation view partially in section of a circuit breaker incorporating the invention.

In the drawings, the invention is shown in FIGURE 1 as incorporated in a single-pole electric circuit breaker comprising an insulating casing including an insulating base portion 10 and an insulating cover portion 11. The base portion 10 has a relatively stationary contact 13 mounted therein on a terminal strap 14 which, in turn, is connected to a line terminal 15, positioned in a recess located at one end of the circuit breaker.

A relatively movable contact 16 is also provided, carried by a two-part contact arm comprising a contact-carrying portion 17 and a mounting portion 18 pivotally interconnected by a pivot pin 19. The contact-carrying portion 17 is biased for rotation about the pivot pin 19 with respect to the mounting portion 18 by means of a compression spring 20, and such rotation is limited in the clockwise direction by engagement of the contact-carrying portion 17 with an upwardly bent stop portion 21 carried by the mounting portion 18.

For the purpose of assisting in extinguishing arcs, chamber 12 is provided with a series of spaced, notched plates 13a, and a generally V-shaped grid 13b, through which arc gases are forced to pass in escaping. The grids 13b are formed of relatively thick sheet metal.

The mounting portion 18 of the contact arm is generally U-shaped and has aligned, generally square openings in the opposite sides thereof. adjacent the bight, through which a common contact cross arm 22 extends, having an enlarged hub portion of generally square cross section and a metallic reinforcing core 23. The portion 18 is attached firmly to the contact cross arm 22 by means of a generally U-shaped fastening member 24 which extends around the contact cross arm and has its end bent extending through and bent over the bight portion of the member 18.

Clockwise rotation of the contact cross arm therefore causes clockwise rotation of the contact arm assembly and engagement of the movable contact 16 with the stationary contact 13. Following initial engagement of these contacts slight further rotation of the contact cross arm takes place causing slight compression of the spring 20, providing dependable contact pressure.

The contact-carrying portion 17 of the contact arm is connected by flexible conductor or braid 25 to a connecting strap 26, which in turn is connected to a relatively rigid magnetic winding conductor 24 encircling a magnet core member 28 and having its other end connected to the lower end of a first elongated bimetallic strip member 29, which in turn is anchored to the insulating casing by suitable means such as by screw 30.

The upper end of the first bimetallic strip 29 is connected by flexible conductor or braid 31 to a terminal strap 32 which in turn is fixedly attached to an outgoing load terminal member 33 positioned in a recess at the load end of the circuit breaker.

The upper end of the first bimetallic strip 29 is interconnected with a second elongated bimetallic strip 56 by means of an interconnecting screw member 57 comprising an insulating body portion 53 having an insulating shoulder portion 55 and a metallic screw portion 59. The screw portion 53 is threadably received in the first bimetallic strip 29 and its end engages the upper end 26' of a pivoted trip bar 26. The body portion 53 of the connector 57 extends through a U-shaped notch (not shown) in the upper end of the second bimetallic strip 56 as seen in FIGURE 1. Bimetallic strip 56 is designed so that with current therethrough it will deflect in a counterclockwise direction against shoulder portion 55 of interconnecting member 57. Bimetallic strip 29 on the other hand, is designed so that with current therethrough it will deflect in a *clockwise* direction. Thus the tripping movement of the bimetallic strip 29 is opposed by the force of bimetallic strip 56.

Bimetallic strip 56 is anchored to the insulating casing by a screw means 58 of terminal member 47 and has its upper end connected by a flexible conductor or braid 54 to a terminal strap 48 which in turn is fixedly connected to a terminal member 52.

Referring to FIGURE 1, the current path, when the contacts are in the closed position, is as follows: from line terminal 15 to terminal strap 14, to stationary contact 13, to movable contact 16, to contact-carrying member 17, to flexible conductor 25, to connection strap 26, to magnetic winding 27, through bimetallic strip 29, to flexible conductor 31, to conductive strap 32, to outgoing load terminal 33, and thence through conductor 49 to load 50, through conductor 51, to return load terminal 52 to conductive strap 48 through flexible conductor 54, through bimetallic strip 56 to ground terminal 47 through conductor 60 to ground. A schematic diagram of this current path is given in FIGURE 2.

The magnetic core 28 has two irregularly shaped pole pieces 34 fixedly attached to the opposite ends thereof. A movable armature 35 is also provided, comprising a member formed out of relatively sheet metal material and pivotally supported by shoulders 36 thereof which rest upon corresponding shoulders or ledges in the insulating casing of base 10. The armature member 35 has an upstanding portion 37 for purposes to be described, an intermediate offset portion, and a depending relatively wide portion 38 which is adapted to be attracted to the pole face portions 34 of the magnet to cause tripping in a manner to be described.

The armature member 35 is biased for rotation counterclockwise by means of an elongated spring (not shown) which is rigidly attached to the armature 35 at a point just above pivot point 36 and which has its lower end extending into engagement with a side edge portion of the side wall of the insulating casing.

The upstanding portion 37 of armature member 35 engages the upper end 26a of pivotally supported trip bar 26 when the lower portion 38 is magnetically attracted to pole faces 34 of magnetic core 28, rotating the trip bar 26 clockwise as viewed. Clockwise rotation of trip bar 26 actuates an operating mechanism in a manner to be described to cause movable contact 16 to move to open circuit position.

Bimetallic strips 29 and 56, which, as previously mentioned, are arranged to deflect in opposite directions, are also chosen to have differing deflecting characteristics or deflecting rates. Specifically, the deflection characteristics of the two bimetals are chosen so that in the "normal" range of currents the deflection of bimetallic strip 29, which has the greater deflection characteristic (i.e., it deflects more for the same value of current), minus the deflection of bimetallic strip 56, is insufficient to cause the screw 59 to engage extension 26a to trip the breaker. However, for currents in the "overcurrent" range, i.e., between about 125% to 300% of the nominal ratings, the deflection of bimetal 29 in comparison with bimetal 56 is such that the net deflection is sufficient to cause tripping, the difference in deflection characteristics becoming significant in the higher current range.

In addition to tripping upon overload conditions, opposed bimetallic strips 29 and 56 also provide ground fault protection for the protected circuit. In operation, assuming for example, a ground fault occurring in the load circuit anywhere between the terminals 49–51, it will be observed that at least some current, instead of going to ground via bimetallic strip 56, will bypass this bimetallic strip, going to the ground through the fault instead, thereby decreasing the amount of current that flows through bimetallic strip 56. The currents passing through the bimetallic strips 29 and 56 will therefore be unequal, the current through bimetallic strip 29 being greater than that though bimetallic strip 56 by the amount of the fault current. Because of this, the net deflection of the system will increase, bimetallic strip 29 being permitted to move to the right, to cause tripping.

To summarize the operation the bimetallic strips 29 and 56, it is noted that under normal conditions, i.e., no current *unbalance* and no *overcurrent* flow, there is a net deflection of the bimetallic strips 29 and 56, but it is insufficient to cause tripping of the breaker. With no current unbalance, but with current flow of a magnitude within the overcurrent range, however, the net deflection becomes sufficient to cause tripping.

Likewise, in the case of a ground fault, where the relative opposing deflection of bimetal 56 is lessened by the lessening of current flow therethrough as compared to current through the bimetallic strip 29, the net deflection of the system becomes sufficient to cause tripping.

Short circuit current protection is provided by means including magnetic core 28 and its associated armature 35. Thus, on the occurrence of a short circuit condition, the armature 35 is drawn to the core 28, causing the upper end 37 to strike the extension 26a of trip bar 26, tripping the breaker. Thus, it will be seen that a circuit breaker has been provided which includes, within the same housing, means capable of responding to three types of faults. Further, all of the above-mentioned means acts on the same trip member 26.

Figure 2:
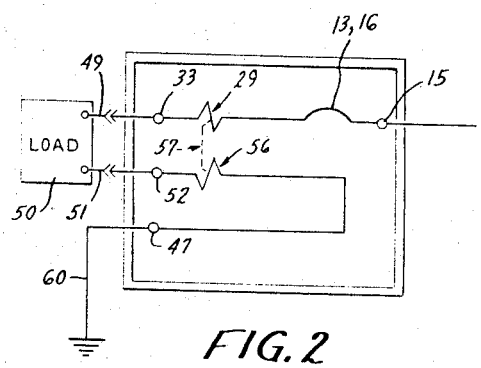
FIGURE 2 is a schematic diagram of the circuit breaker of FIGURE 1.
Figure 3:
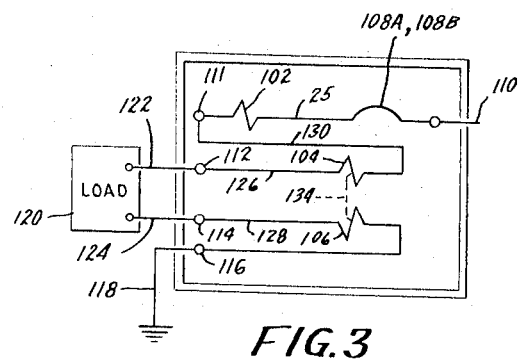
FIGURE 3 is a schematic diagram of another embodiment of the invention.
Figure 4:
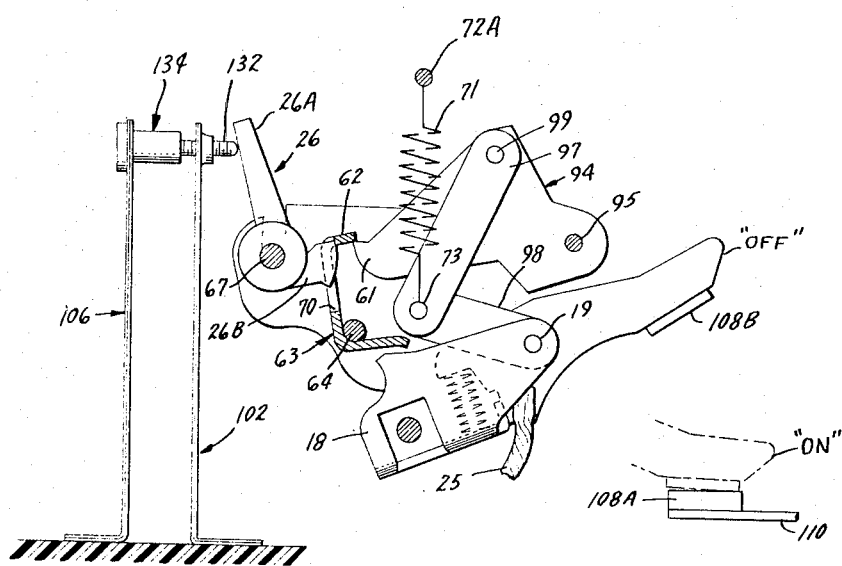
FIGURE 4 is a side elevation view of the circuit breaker of FIGURE 3.
Figure 5:
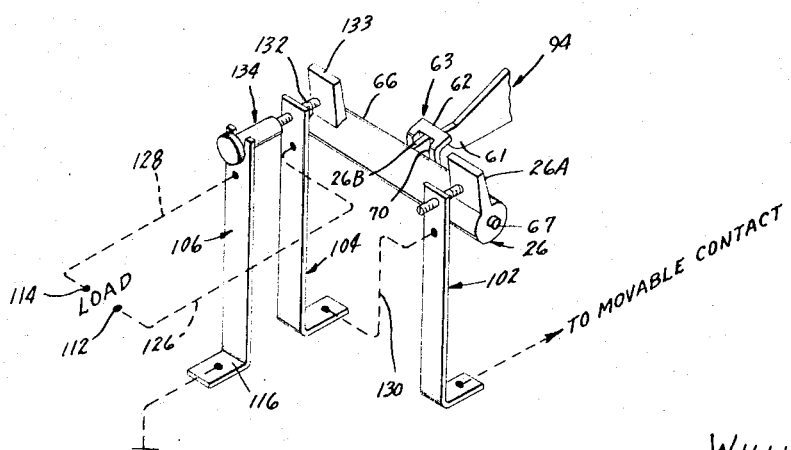
FIGURE 5 is a fragmentary perspective view of the bimetallic strip and trip bar portions of the circuit breaker of FIGURE 3.

In FIGURES 3–5, a second embodiment of the invention is shown. This embodiment differs chiefly from the embodiment of FIGURES 1–2 in that the ground-fault sensitive mechanism, while contained within the same casing and acting on the same trip member as the overload-sensitive and short-circuit sensitive trip means, is independent of the overload responsive bimetallic strip.

OPERATING MECHANISM

The operating mechanism for the circuit breaker is shown in FIGURE 4. As stated hereinabove, this operating mechanism is similar to that used for the circuit breaker of FIGURE 1. This mechanism is similar to the type shown and described in the United States Patent Number 3,105,132 granted Sept. 24, 1963, to C. L. Jencks and assigned to the same assignee as the present invention. Since the mechanism is described in detail in the aforesaid patent, only a brief description will be included here.

The operating mechanism includes a pair of interconnected toggle links 97 and 98, pivotally connected to a releasable trip member at 99 and to the contact arm assembly at 19, connecting two portions of the contact arm. A releasable trip member 94 includes a latching projection 61 which is normally in engagement with a bent over portion 62 of an intermediate latch member 63, pivotally supported between the side walls of the mechanism on pin 64. The intermediate latch member 63 is normally held in the position shown in FIGURE 4 by engagement with latch retaining portion 26b of trip bar 26 pivotally supported between the sides of the mechanism upon a pivot pin 67. The trip bar 26 has an upstanding projection 26A and carries the latch-retaining portion 26b which normally retains the latch 63 as previously described.

It will therefore be observed that clockwise rotation of the releasable trip member 94 exerts a counterclockwise bias on the intermediate latch member 63. The latch member 63 is prevented from rotating in a counterclockwise position, however, by its engagement with portion 26b of the trip bar 26.

The toggle members 97 and 98 are operated between collapsed and straightened positions to move the movable contact between corresponding open and closed circuit positions, by means of overcenter tension-type springs 71 which are connected between a pin 72A carried by a manually operable member, not shown, and the knee point 73 of the toggle linkage.

The operation of the circuit breaker mechanism will be described with reference to FIGURE 4. It will be observed that as the pin 72A is moved toward the right as viewed, the tension springs 71 pass overcenter across the line of centers of pins 99 and 73 and thereafter cause the upper toggle link 97 to rotate in a counterclockwise position about its pivotal support 99 on the releasable trip member 94, straightening the toggle linkage and moving the contact arm 18 to closed position.

When the releasable trip member 94 is released by action of a current responsive device, the tension spring 71 draws the toggle knee pivot pin 73 of the toggle linkage upwardly, rotating the trip member 94 clockwise about its pivotal support 95 and moving the contact arms to an open position.

TRIPPING MEANS OF FIGURE 4 EMBODIMENT

The protective portion of the circuit breaker of FIGURE 4 includes overcurrent responsive means including bimetal 102, see FIGURE 5, and short circuit current responsive means (not shown) similar to that described in connection with FIGURE 1. From the top or movable end of bimetallic strip 102, connection is made through a flexible conductor or braid 130 to the base of a second bimetallic strip 104 which is anchored to the insulating casing by suitable means not shown. The upper end of bimetal 104 is provided with a hole (not shown) which threadably receives a screw 132 which bears against an extension portion 133 of trip bar 66. The screw 132 includes a headed insulating portion 134 engaging a third bimetallic strip which is arranged to deflect in a direction opposite from bimetallic strip 104. Third bimetallic strip 106 is anchored at its base 116 to the insulating casing by a suitable means such as by a screw, not shown. The upper end of the second bimetallic strip 104 is connected by means of a flexible conductor or braid 126 to an outgoing load terminal member 112, while the upper end of third bimetallic strip 106 is connected by means of a conductor or braid 128 to a return terminal member 114.

The primary current path, when the contacts are in the closed position, is as follows, referring to schematic diagram FIGURE 3: beginning with line terminal 110: from line terminal 110, to contacts 108A, 108B, to first bimetallic strip 102 to terminal member 111 through conductor 130, to second bimetallic strip 104, through conductor 126 to outgoing load terminal 112, through a conductor 122 to a load 120, through conductor 124 to return load terminal 114 through conductor 128 to bimetallic strip 106, to ground terminal 116 and thence to ground or to a neutral (not shown) through conductor 118.

OPERATION OF FIGURE 4 EMBODIMENT

The operation of the invention as incorporated in the embodiment illustrated in FIGURES 3–5 is similar to that of the device of FIGURES 1–2, but is different in one important respect. By using a third bimetallic strip the operations of the overcurrent responsive means and of the ground fault responsive means are made independent of one another. Bimetallic strip 102 provides overcurrent protection, while the bimetallic strips 104 and 106 provide ground fault protection. In operation, assuming a ground fault on conductor 122 or 124 (see FIGURE 3), it will be observed that the current through bimetallic strip 104 is not diminished because strip 104 is on the source side of the fault. However, current flow through bimetallic strip 106 is diminished because of the current flowing to ground through the fault. Thus, because of the diminished opposing deflection of bimetallic strip 106 due to the decreased current therethrough, the net deflection of strip 104 and associated screw means 132 is sufficient to move extenison 133 to release releasable trip member 94 to trip the breaker.

Bimetallic strips 104 and 106, because they provide ground fault protection only, preferably have identical deflection characteristics (except, of course, for direction of deflection).

The arrangement of FIGURES 3–5 has the advantage of simplifying calibration of the device, since the operation of the main current responsive bimetallic strip is essentially unaffected by the ground fault bimetallic strips 104, 106.

While I have disclosed only two embodiments of the invention, it will be readily appreciated that many modifications thereof may be made. I, therefore, intend by the appended claims to cover all such modifications as fall within the true spirit and scope of the invention.

I claim:

1. An electric circuit breaker for use in protecting a predetermined electrical circuit comprising:
   (a) a housing;
   (b) at least one pair of relatively movable contacts in said housing;
   (c) operating means in said housing for operating said contacts between open and closed circuit position, said operating means including a manually operable member and a member releasable to cause automatic opening of said contacts;
   (d) a trip member in said housing movable to cause release of said releasable member;
   (e) thermal overcurrent responsive means in said housing operable to cause releasing movement of said trip member upon the occurrence of predetermined overcurrents through said contacts;
   (f) magnetic short circuit current responsive means in said housing operable to cause releasing movement of said trip member upon the occurrence of predetermined short circuit currents through said contacts;
   (g) ground fault responsive means in said housing operable to cause releasing movement of said trip member upon the occurrence of predetermined ground fault current in said electrical circuit.

2. An electrical circuit breaker as set forth in claim 1 wherein said thermal overcurrent responsive means includes a first bimetallic strip and said ground fault responsive means includes a second bimetallic strip arranged to deflect in a direction to oppose the deflection of said first bimetallic strip wherein the net deflection of said first bimetallic strip controls the releasing movement of said trip member.

3. An electric circuit breaker as set forth in claim 1 wherein said ground fault responsive means comprises a first bimetal located in an outgoing line and a second bimetal located in a return line arranged to oppose said first bimetal.

4. An electric circuit breaker as set forth in claim 2 where deflection per unit of current characteristics of said first and second bimetallic strips are different.

5. An electrical circuit breaker for use in protecting a predetermined electrical circuit including an outgoing and a return conductor comprising:
   (a) a housing;
   (b) at least one pair of relatively movable contacts in said housing;
   (c) operating means in said housing for operating said contacts between open and closed circuit position, said operating means including a manually operable member and a member releasable to cause automatic opening of said contacts;
   (d) a trip member in said housing movable to cause release of said releasable member;
   (e) first current responsive means in said housing connected electrically in series with said first electrical conductor providing a first force proportional to current flowing in said first electrical conductor;
   (f) a second current responsive means in said housing connected electrically in series with said second electrical conductor providing a second force proportional to current flowing in said second electrical conductor;
   (g) said first and second current responsive means being arranged so that first force opposes said second force;
   (h) control means responsive to a net force resulting from said first and second forces;
   (i) said control means including means for causing releasing movement of said trip member.

References Cited

UNITED STATES PATENTS

| | | | |
|---|---|---|---|
| 3,259,802 | 4/1966 | Steen | 317—18 |
| 3,278,708 | 10/1966 | Casey | 335—35 |

BERNARD A. GILHEANY, *Primary Examiner.*

H. BROOME, *Assistant Examiner.*

U.S. Cl. X.R.

335—35